US009013125B2

(12) United States Patent
Kitanaka (10) Patent No.: US 9,013,125 B2
(45) Date of Patent: Apr. 21, 2015

(54) ELECTRIC POWER CONVERTER OF ELECTRIC ROLLING STOCK

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 595 days.

(21) Appl. No.: 13/386,113

(22) PCT Filed: Aug. 17, 2009

(86) PCT No.: PCT/JP2009/064404
§ 371 (c)(1),
(2), (4) Date: Jan. 20, 2012

(87) PCT Pub. No.: WO2011/021265
PCT Pub. Date: Feb. 24, 2011

(65) Prior Publication Data
US 2012/0187875 A1    Jul. 26, 2012

(51) Int. Cl.
H02P 3/18       (2006.01)
B60L 9/22       (2006.01)
B60L 7/14       (2006.01)

(52) U.S. Cl.
CPC ... B60L 9/22 (2013.01); B60L 7/14 (2013.01); B60L 2210/10 (2013.01); Y02T 10/7216 (2013.01); B60L 2200/26 (2013.01)

(58) Field of Classification Search
USPC .............................. 318/400.26, 722, 376, 432
See application file for complete search history.

(56) References Cited

U.S. PATENT DOCUMENTS

| | | | |
|---|---|---|---|
| 4,701,682 A * | 10/1987 | Hirotsu et al. .................. 318/52 |
| 5,248,926 A * | 9/1993 | Kotake et al. ................. 318/807 |
| 5,504,667 A * | 4/1996 | Tanaka et al. .................. 363/37 |
| 6,938,713 B1 * | 9/2005 | Tahara et al. .............. 180/65.26 |
| 7,164,253 B2 * | 1/2007 | Sato et al. ..................... 318/801 |
| 7,212,891 B2 * | 5/2007 | Sato ................................. 701/22 |
| 7,486,034 B2 * | 2/2009 | Nakamura et al. ............ 318/139 |
| 8,008,801 B2 * | 8/2011 | Fujino et al. ................. 307/10.1 |

(Continued)

FOREIGN PATENT DOCUMENTS

| | | |
|---|---|---|
| EP | 0787620 A2 | 8/1997 |
| JP | 4-156203 A | 5/1992 |

(Continued)

OTHER PUBLICATIONS

International Search Report (PCT/ISA/210) issued on Sep. 8, 2009, by Japanese Patent Office as the International Searching Authority for International Application No. PCT/JP2009/064404.

(Continued)

*Primary Examiner* — Bentsu Ro
*Assistant Examiner* — Thai Dinh
(74) *Attorney, Agent, or Firm* — Buchanan Ingersoll & Rooney PC (57) ABSTRACT

An electric power converter of an electric rolling stock includes: a converter unit (a first electric-power converting unit) that receives a direct-current voltage and outputs a direct-current voltage controlled to a predetermined value; and an inverter unit (a second electric-power converting unit) that is connected to the output side of the converter unit and drives an electric motor. The converter unit includes a converter control unit (a first control unit) that, based on the input voltage thereof, generates an output voltage command that is a control command for controlling the condition of the output voltage of the converter unit.

9 Claims, 5 Drawing Sheets

(56) References Cited

U.S. PATENT DOCUMENTS

| | | | |
|---|---|---|---|
| 2007/0289794 A1* | 12/2007 | Ishikawa et al. | 180/165 |
| 2009/0066277 A1* | 3/2009 | Ang et al. | 318/400.17 |
| 2010/0038962 A1* | 2/2010 | Komatsu | 307/10.1 |
| 2010/0171448 A1* | 7/2010 | Kitanaka | 318/45 |

FOREIGN PATENT DOCUMENTS

| | | | |
|---|---|---|---|
| JP | 5-137209 A | 6/1993 | |
| JP | 5-184006 A | 7/1993 | |
| JP | 6-276601 A | 9/1994 | |
| JP | 9-215105 A | 8/1997 | |
| JP | 2002-252902 A | 9/2002 | |
| JP | 2002-369310 A | 12/2002 | |
| JP | 2004-056934 A | 2/2004 | |
| JP | 2005-304156 A | 10/2005 | |
| JP | 2006-314182 A | 11/2006 | |
| JP | 2008-043174 A | 2/2008 | |
| JP | 2008-086077 A | 4/2008 | |
| JP | 4713690 B2 | 6/2011 | |
| WO | WO 2011/021265 A1 | 2/2011 | |

OTHER PUBLICATIONS

Written Opinion (PCT/ISA/237) issued on Sep. 8, 2009, by Japanese Patent Office as the International Searching Authority for International Application No. PCT/JP2009/064404.

Notice of Rejection issued on Oct. 13, 2011 by Japanese Patent Office for Application No. 2011-065042.

Decision of a Patent Grant issued on Oct. 13, 2011 by Japanese Patent Office for Application No. 2011-065041.

Chinese Office Action (Text of the First Office Action) dated Sep. 29, 2013, issued in corresponding Chinese Application No. 2009801610026, and an English translation of the Office Action.

Office Action dated Mar. 4, 2013, issued by the Canadian Patent Office in the corresponding Canadian Application No. 2771315. (3 pages).

* cited by examiner

ELECTRIC POWER CONVERTER OF ELECTRIC ROLLING STOCK

FIELD

The present invention relates to an electric power converter installed to perform propulsion control of an electric rolling stock.

BACKGROUND

Generally, an electric rolling stock has a construction to receive the electric power from a catenary using a power collector and to use the received power and cause an electric power converter such as an inverter apparatus to drive an electric motor so as to run. At the time of applying a brake on the rolling stock car, what is called regenerative braking is employed in which the brake force is obtained by means of a regenerative operation of the electric motor. The regenerative electric power generated at that time is supplied, via a catenary, a third rail or the like, to other power-running vehicles or the loads of the power-running vehicles which are located in the vicinity of the electric rolling stock under consideration, and is consumed therein.

However, in the early hours of the morning, during nighttime, or in a quiet railroad section having few trains running thereon, there occurs a situation where no other vehicle is present in the vicinity of the electric rolling stock under consideration (the regenerative load is insufficient), which leads to a situation where the regenerative electric power generated by regenerative braking is not sufficiently consumed. If the regenerative electric power in the electric rolling stock under consideration exceeds the electric power consumed in other vehicles, then the catenary voltage is increased. This may cause various devices connected to the catenary to be tripped and broken due to overvoltage.

In this regard, an inverter apparatus that is installed in an electric rolling stock includes a voltage detector for detecting the catenary voltage or the like (the overhead wiring voltage or e.g., a filter capacitor voltage on the input side of the inverter apparatus, comparable to the catenary). When the catenary voltage or the like increases above a predetermined value, the inverter apparatus performs a regenerative torque decreasing control in which the regenerative braking force is controlled to restrain the generation of regenerative electric power and to ensure that the catenary voltage or the like does not increase up to or greater than the specified value.

Herein, in the case where the specified input voltage of an inverter apparatus functioning as a second electric-power converting unit is lower than the catenary voltage (for example, specification of 600 V), a main circuit is assumed to be configured in which a converter apparatus functioning as a first electric-power converting unit is connected to the input side of the inverter apparatus and is used to supply a voltage to the inverter apparatus with performing step-down control or constant voltage control of the catenary voltage.

For example, for a system having a nominal value of the catenary voltage of 1500 volts DC, a configuration is known in which a converter apparatus steps down the output voltage thereof to about 600 VDC and performs constant voltage control, before inputting that voltage to the inverter apparatus (for example, Patent Literature 1 mentioned below).

In a system having such a main circuit configuration, even when the regenerative load is insufficient thereby leading to an increase in the catenary voltage, the constant voltage control is performed so as to maintain the output voltage of the converter apparatus at a constant voltage. In this way, the input voltage of the inverter apparatus does not vary and the regenerative torque decreasing control is not initiated. For that reason, the regenerative electric power becomes surplus thereby leading to increase in the input voltage of the converter apparatus and to result in the input to the converter apparatus being overvoltage. Thus, the converter apparatus may detect the overvoltage and trip, and/or devices connected to the catenary may be damaged.

CITATION LIST

Patent Literature

Patent Literature 1: Japanese Patent Application Laid-open No. 2002-252902

SUMMARY

Technical Problem

In the system disclosed in Patent Literature 1 mentioned above, there is no disclosure of a method for regenerative torque decreasing control, in which an input to the inverter apparatus corresponds to a catenary voltage, and which is intended for a situation where the catenary voltage is stepped down by the converter apparatus to input the result to the inverter apparatus.

The present invention has been made in view of the above-mentioned issues, and it is an object of the present invention to provide an electric power converter for an electric rolling stock, that makes it possible to perform suitable regenerative torque decreasing control in the case where a main circuit is configured in which a converter apparatus functioning as a first electric-power converting unit is connected to the input side of an inverter apparatus and is used to supply a voltage to the inverter apparatus with performing step-down control or constant voltage control of the catenary voltage.

Solution to Problem

In order to solve the above-mentioned problems and achieve the object, the present invention provides an electric power converter of an electric rolling stock comprising: a first electric-power converting unit that receives a direct-current voltage and outputs a direct-current voltage controlled to a predetermined value; and a second electric-power converting unit that is connected to an output side of the first electric-power converting unit and drives an electric motor, wherein the first electric-power converting unit includes a first control unit that, based on the input voltage thereof, generates a control command for controlling a condition of an output voltage of the first electric-power converting unit.

Advantageous Effects of Invention

According to the present invention, it is possible to perform suitable regenerative torque decreasing control in the case where a main circuit is configured in which a converter apparatus functioning as a first electric-power converting unit is connected to the input side of an inverter apparatus and is used to supply a voltage to the inverter apparatus with performing step-down control or constant voltage control of the catenary voltage.

DESCRIPTION OF EMBODIMENTS

Embodiments of an electric power converter of an electric rolling stock according to the present invention are described below in detail with reference to the accompanying drawings. Noted is that the present invention is not limited to the embodiments.

First Embodiment

Figure 1:
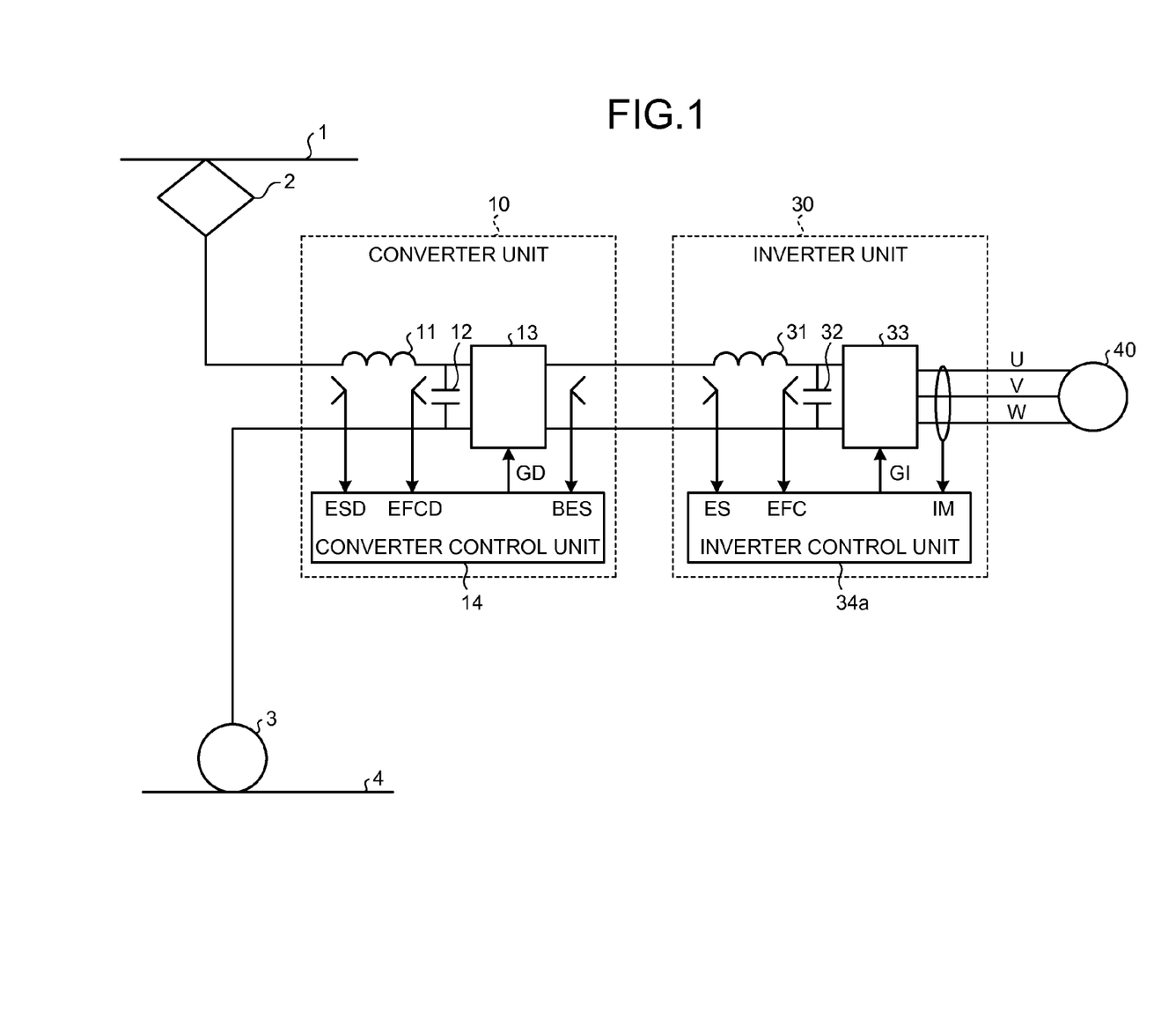
FIG. 1 is a diagram illustrating a configuration example of an electric power converter of an electric rolling stock according to a first embodiment of the present invention.

FIG. 1 is a diagram illustrating a configuration example of an electric power converter of an electric rolling stock according to a first embodiment of the present invention. As illustrated in FIG. 1, electric power from a transformer substation (not illustrated) is inputted to a converter unit 10, which functions as a first electric-power converting unit, via a power collector 2 from a catenary 1. The return current from the converter unit 10 is coupled to a rail 4 via a wheel 3 and goes back to the negative side of the transformer substation (not illustrated).

The converter unit 10 includes an input filter having a reactor 11 and a capacitor 12, a converter circuit 13 connected subsequently to the input filter, and a converter control unit 14 functioning as a first control unit. As the converter circuit 13, a bidirectional step-up/down chopper circuit is suitable. Since the circuit configuration of a bidirectional step-up/down chopper circuit is publicly known, the explanation thereof is omitted. Moreover, in general, the converter circuit 13 includes an output filter circuit composed of a reactor and a capacitor for the purpose of smoothing the output voltage or current of the converter circuit 13.

To the converter control unit 14, an input voltage ESD of the converter unit 10, a voltage EFCD of the capacitor 12, and an output voltage BES of the converter circuit 13 are inputted. The converter control unit 14 outputs a control signal GD intended for a switching element inside the converter circuit 13.

The converter control unit 14 performs control such that the output voltage BES of the converter circuit 13 has a predetermined value. The details thereof are given later.

To the output of the converter unit 10, an inverter unit 30 that functions as a second electric-power converting unit is connected. The inverter unit 30 includes an input filter having a reactor 31 and a capacitor 32, an inverter circuit 33 connected subsequently to the input filter, and an inverter control unit 34a functioning as a second control unit. As the inverter circuit 33, a voltage-type PWM inverter circuit is suitable. Since the circuit configuration of the voltage-type PWM inverter circuit is publicly known, the explanation thereof is omitted.

To the inverter control unit 34a, an input voltage ESD of the inverter unit 30, a voltage EFC of the capacitor 32, and an output current IM of the inverter circuit 33 are inputted. The inverter control unit 34a outputs a control signal GI intended for a switching element inside the inverter circuit 33.

The inverter control unit 34a controls the output current and the output voltage of the inverter circuit 33 in such a way that an electric motor 40 (described later) generates a torque according to a torque command. The details thereof are given later.

Figure 2:
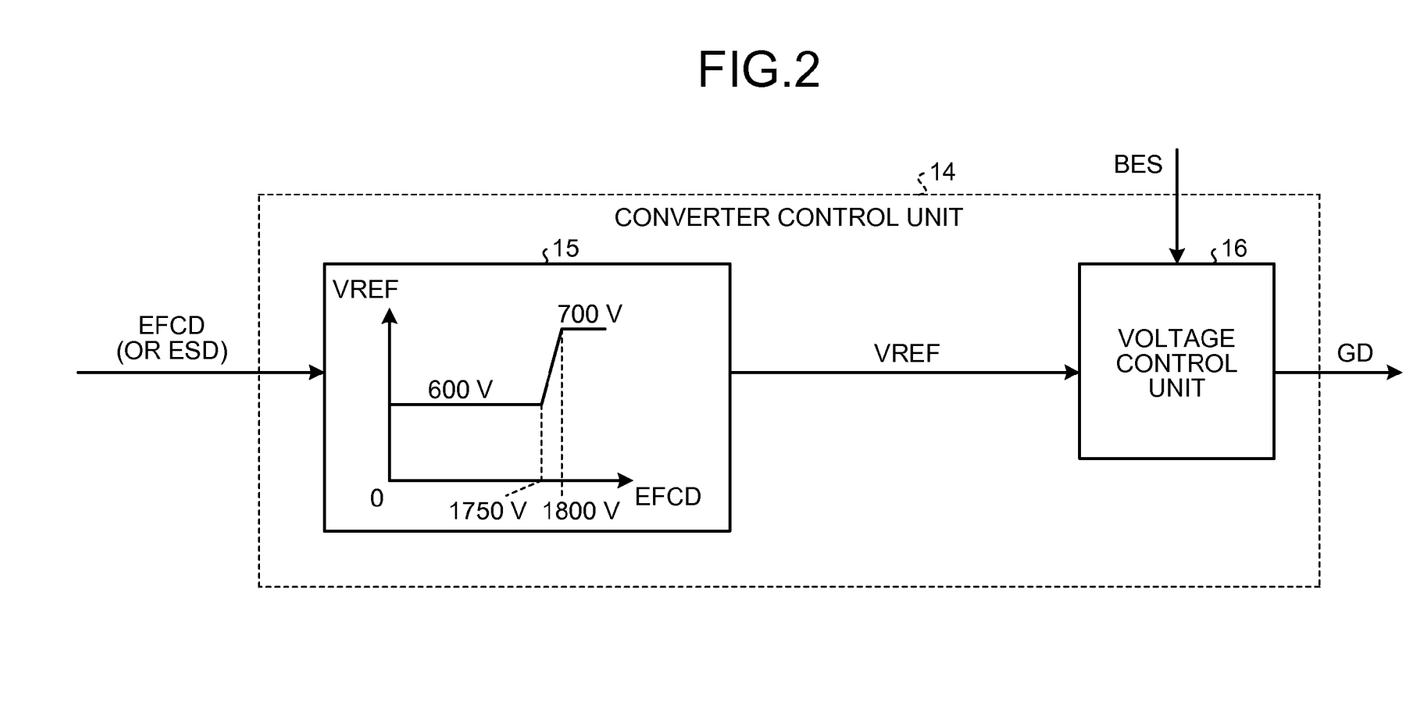
FIG. 2 is a diagram illustrating a configuration example of a converter control unit according to the first embodiment of the present invention.

Explained below is a configuration of the converter control unit 14. FIG. 2 is a diagram illustrating a configuration example of the converter control unit 14 according to the first embodiment of the present invention. To the converter control unit 14, the capacitor voltage EFCD or the input voltage ESD is inputted. The converter control unit 14 includes a voltage command processing unit 15 that generates an output voltage command VREF that is a control command for controlling the condition of the output voltage of the first electric-power converting unit, and a voltage control unit 16 that performs voltage control based on the output voltage command VREF in such a way that the output voltage BES of the converter unit 10 matches with the output voltage command VREF.

For example, in a region in which the capacitor voltage EFCD is equal to or smaller than 1750 V, the voltage command processing unit 15 sets the output voltage command VREF to 600 V that represents the normal value as well as represents a first setting value.

When the capacitor voltage EFCD exceeds 1750 V, for example, the voltage command processing unit 15 increases increasing the output voltage command VREF from 600 V, and when the capacitor voltage EFCD becomes 1800 V, the voltage command processing unit 15 increases the output voltage command VREF up to 700 V that represents a second setting value.

Herein, all values are exemplary and are not ones obtained by any limitation. Rather, as long as the output voltage command VREF is increased in response to increase in the capacitor voltage EFCD or the input voltage ESD above a predetermined value, any configuration can be implemented.

Figure 3:
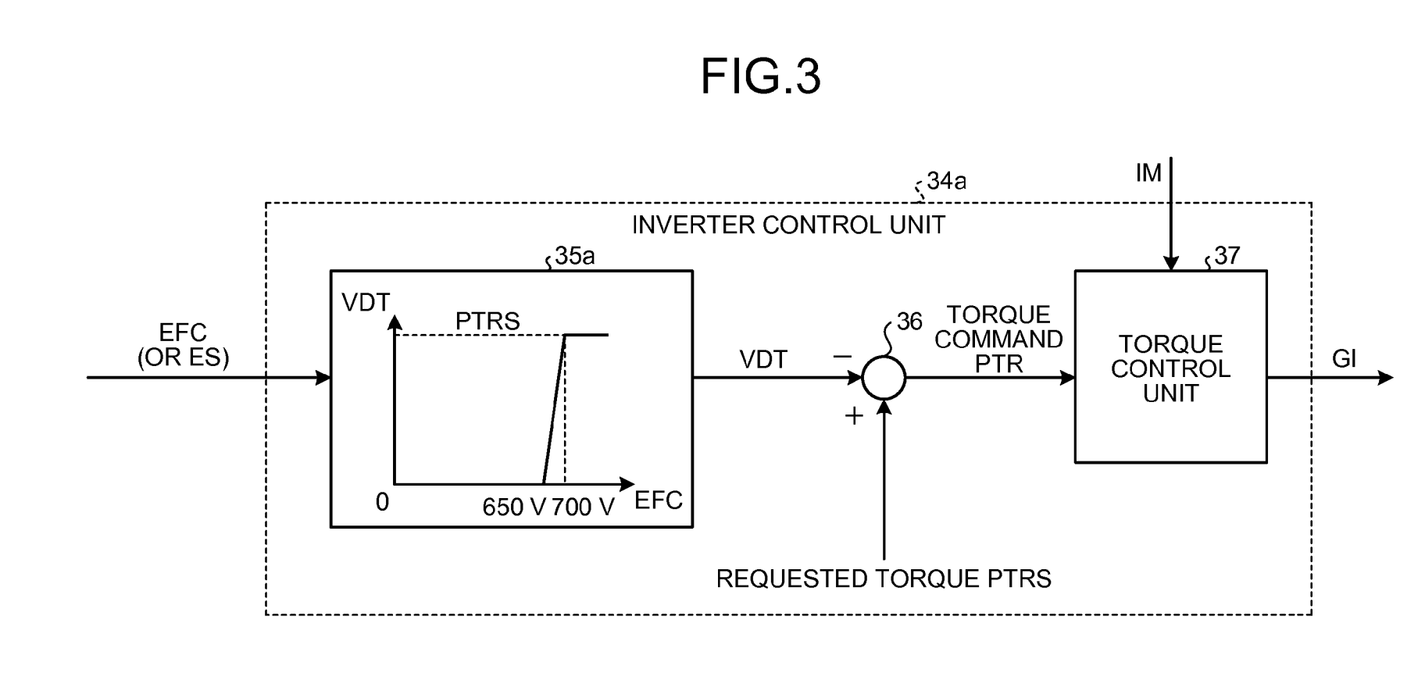
FIG. 3 is a diagram illustrating a configuration example of an inverter control unit according to the first embodiment of the present invention.

Explained below is a configuration of the inverter control unit 34a. FIG. 3 is a diagram illustrating a configuration example of the inverter control unit 34a according to the first embodiment of the present invention. To the inverter control unit 34a, a capacitor voltage EFC or an input voltage ES of the inverter unit 30 is inputted. The inverter control unit 34a includes: a regenerative torque decreasing amount calculating unit 35a that generates a torque decreasing amount VDT based on the capacitor voltage EFC or the input voltage ES; a subtractor 36 that outputs a torque command PTR by subtracting the torque decreasing amount VDT from a requested torque PTRS, which is the requested value of the regenerative braking torque generated in an external control unit (not illustrated); and a torque control unit 37 that performs torque control based on the torque command PTR in such a way that the electric motor 40 generates regenerative torque according to the torque command PTR.

For example, in the region in which the capacitor voltage EFC or the input voltage ES is equal to or smaller than 650 V, the regenerative torque decreasing amount calculating unit 35a sets the torque decreasing amount VDT to zero. In this case, the requested torque PTRS=the torque command PTR is satisfied.

In the region in which the capacitor voltage EFC or the input voltage ES is greater than 650 V, for example, the regenerative torque decreasing amount calculating unit 35a increases the torque decreasing amount VDT, and at the point of time when the capacitor voltage EFC or the input voltage ES becomes 700 V, the regenerative torque decreasing amount calculating unit 35a increases the torque decreasing amount VDT until it becomes equal to the requested torque PTRS, and then sets the torque command PTR to zero.

Herein, all values are exemplary and are not ones obtained by any limitation. Rather, as long as the torque decreasing amount VDT is increased in response to increase in the capacitor voltage EFC or the input voltage ES above a predetermined value, any configuration can be implemented.

Given below is the explanation of operations in the case where the electric rolling stock is applying a regenerative brake, that is, where the inverter unit 30 is performing regenerative operation of the electric motor 40. At that time, the regenerative electric power from the electric motor 40 is inputted to the converter unit 10 via the inverter unit 30. The converter unit 10 maintains the output voltage BES at a constant, predetermined value, while at the same time, it passes the electric power from the output side thereof to the input side thereof, and regenerates the regenerative electric power to the catenary 1.

At this time, for example, if a situation occurs when another vehicle on the catenary 1, that has been accelerating stops its acceleration thereby leading to decrease in the consumed regenerative electric power (hereinafter, presented as regenerative load) to such an extent that the regenerative load drops below the regenerative electric power of the electric motor 40, then the input voltage ESD or capacitor voltage EFCD of the converter unit 10 increases. If that condition is left as it is, then the input voltage ESD or the capacitor voltage EFCD increases, so that the converter unit 10 detects an overvoltage and trips, and the devices connected to the catenary are damaged.

Generally, in an electric railroad for which the catenary 1 has a nominal voltage of 1500 volts DC, it is necessary to ensure that the voltage of the catenary 1 does not exceed 1750 V to 1800 V. To this end, when the capacitor voltage EFCD becomes equal to or greater than a predetermined value (in FIG. 2, 1750 V or more), the voltage command processing unit 15 of the converter control unit 14 increases the output voltage command VREF from the normal control value of 600 V, and at the point of time when the capacitor voltage EFCD is 1800 V, the voltage command processing unit 15 increases the output voltage command VREF to 700 V. In response to this, the output voltage BES of the converter unit 10 increases from 600 V to 700 V.

In this way, by increasing the output voltage BES, the converter control unit 14 becomes able to transfer the energy of the capacitor 12 to the output side of the converter unit 10. This enables curbing increase in the capacitor voltage EFCD.

Besides, since the inverter control unit 34a performs operations as described below to curb the regenerative electric power, it becomes possible to curb increase in the capacitor voltage EFCD. If the output voltage BES of the converter unit 10 increases, the input voltage ES or capacitor voltage EFC of the inverter unit 30 increases. Based on the increase in the capacitor voltage EFC or the input voltage ES, the regenerative torque decreasing amount calculating unit 35a generates the torque decreasing amount VDT and narrows the torque command PTR down (regenerative torque decreasing control).

In the regenerative torque decreasing amount calculating unit 35a, at the point of time when the capacitor voltage EFC or the input voltage ES becomes 700 V, the torque decreasing amount VDT is set to be equal to the requested torque PTRS. Consequently, the torque command PTR becomes zero and the regenerative torque of the electric motor 40 is controlled to be zero. As a result, the regenerative electric power from the electric motor 40 becomes zero, and the input voltage of the converter unit 10 is restrained from increasing. The input voltage of the converter unit 10 does not become equal to or greater than 1800 V.

As described above, when the regenerative load is insufficient thereby leading to increase in the catenary voltage, the electric power converter of the electric rolling stock according to the present embodiment increases the output voltage BES of the converter unit 10 so as to increase the input voltage of the inverter unit 30, and operates to ensure that the inverter control unit 34a performs torque decreasing of the regenerative torque. Hence, it becomes possible to avoid a situation in which the input voltage of the converter unit 10 increases due to surplus regenerative electric power thereby leading to an overvoltage in the converter unit 10 and tripping of the apparatus, and/or damage of the apparatus.

Moreover, in the configuration according to the first embodiment, since there is no communication of control signals between the converter unit 10 and the inverter unit 30, it becomes possible to reduce the hard-wiring.

Meanwhile, the converter control unit 14 may have such a configuration that only when a direction of the electric power passing through the converter unit 10 is the direction from the output side toward the input side of the converter unit 10 (only when the electric motor 40 is performing regenerative operation), the converter control unit 14 increases the output voltage command VREF in response to increase in the input voltage of the converter unit 10.

With such a configuration, for example, if the voltage of the catenary 1 increases while the electric motor 40 is power-running, the need for increasing the output voltage BES of the converter unit 10 is eliminated. Hence, it becomes possible to prevent increase in the circuit loss of the inverter unit 30 (the switching loss in the inverter circuit 33) that may occur due to increase in the voltage.

Meanwhile, in the description given above, the case of controlling the output voltage command VREF as a control command is explained. However, it is also possible to control other commands. For example, although not illustrated in the drawings, an output current command that is a command for the output current of the converter circuit 13 may also be controlled. That is because, even by controlling the output current, the output voltage BES can be controlled indirectly.

Second Embodiment

Figure 4:
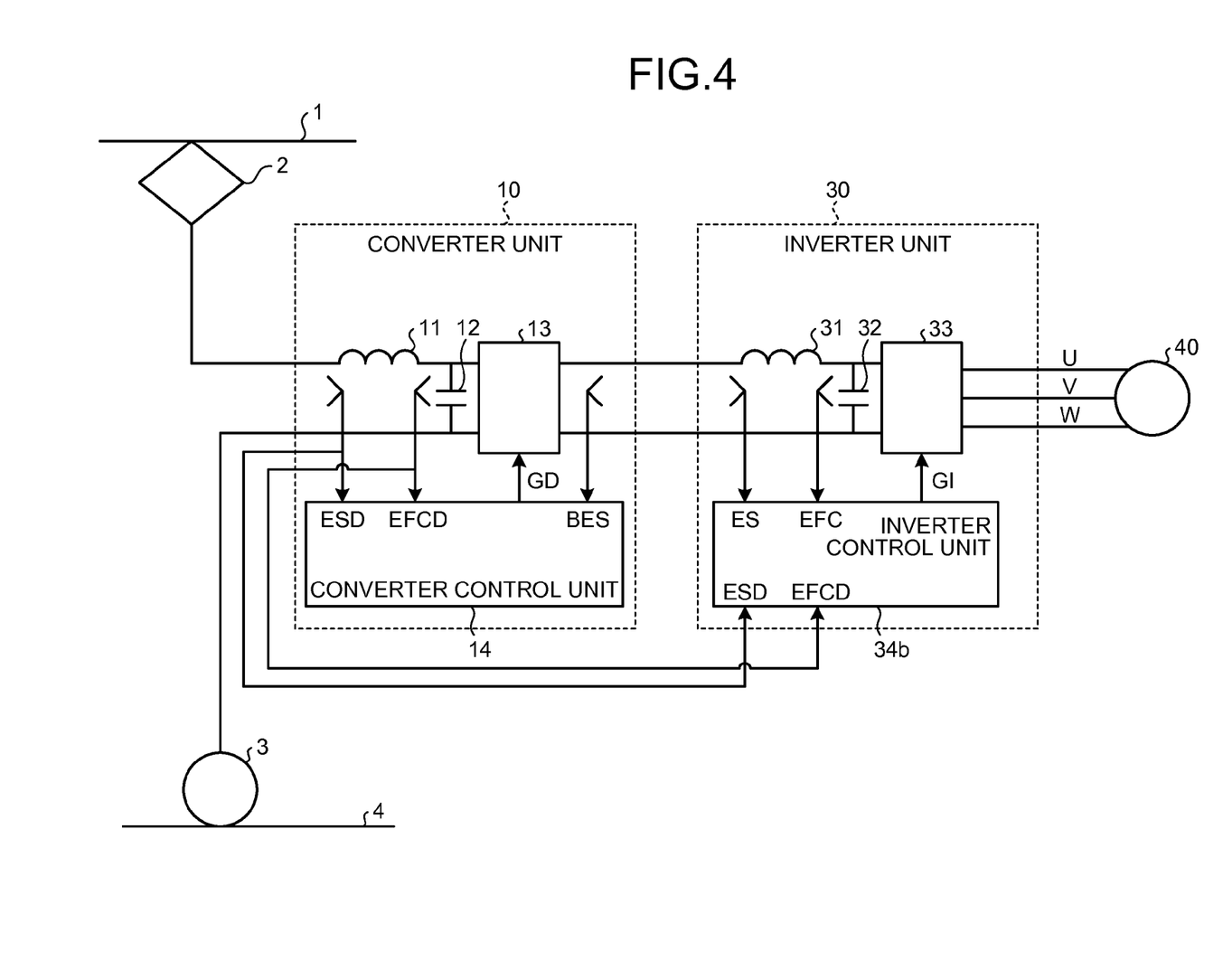
FIG. 4 is a diagram illustrating a configuration example of the electric power converter of the electric rolling stock according to a second embodiment of the present invention.

FIG. 4 is a diagram illustrating a configuration example of the electric power converter of the electric rolling stock according to a second embodiment of the present invention. Herein, FIG. 4 is a diagram in compliance with FIG. 1, and so the explanation is given only regarding differences from FIG. 1.

The configuration illustrated in FIG. 4 differs from the configuration illustrated in FIG. 1 in that the input voltage ESD and capacitor voltage EFCD of the converter unit 10 are inputted to an inverter control unit 34b of the inverter unit 30.

Figure 5:
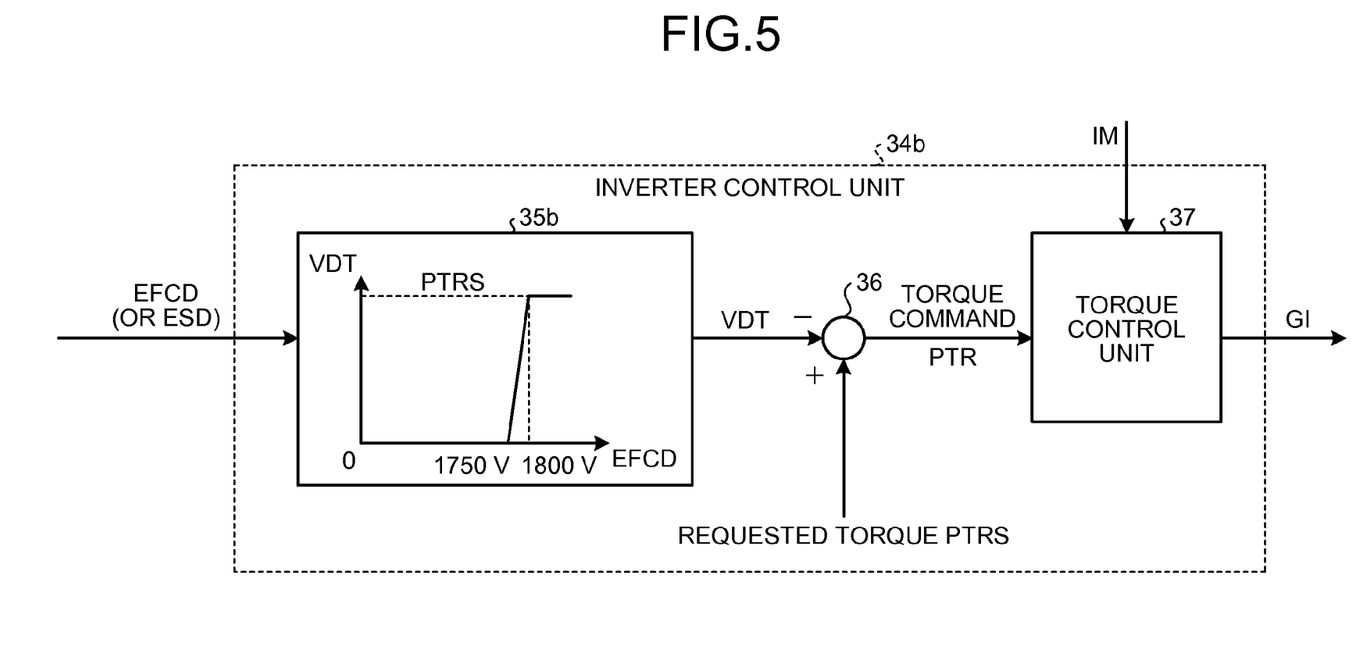
FIG. 5 is a diagram illustrating a configuration example of an inverter control unit according to the second embodiment of the present invention.

Explained below is a configuration of the inverter control unit 34b. FIG. 5 is a diagram illustrating a configuration example of the inverter control unit 34b according to the second embodiment of the present invention. To the inverter control unit 34b, the capacitor voltage EFCD or input voltage ESD of the converter unit 10 is inputted. The inverter control unit 34b includes: a regenerative torque decreasing amount calculating unit 35b that generates the torque decreasing amount VDT based on the capacitor voltage EFCD or input voltage ESD; the subtractor 36 that outputs the torque command PTR by subtracting the torque decreasing amount VDT from the requested torque PTRS, which is the requested value of the regenerative braking torque generated in an external control unit (not illustrated); and the torque control unit 37 that performs torque control based on the torque command PTR in such a way that the electric motor 40 generates regenerative torque according to the torque command PTR.

For example, in the region in which the capacitor voltage EFCD or the input voltage ESD is equal to or smaller than 1750 V, the regenerative torque decreasing amount calculating unit 35b sets the torque decreasing amount VDT to zero. In this case, the requested torque PTRS=the torque command PTR is satisfied.

For example, in the region in which the capacitor voltage EFCD or the input voltage ESD is greater than 1750 V, the regenerative torque decreasing amount calculating unit 35b increases the torque decreasing amount VDT, and at the point of time when the capacitor voltage EFCD or the input voltage ESD becomes 1800 V, the regenerative torque decreasing amount calculating unit 35b increases the torque decreasing amount VDT until it becomes equal to the requested torque PTRS, and then sets the torque command PTR to zero. Herein, all values are exemplary and are not to be considered as restrictive. Rather, as long as the torque decreasing amount VDT is increased in response to increase in the capacitor voltage EFCD or the input voltage ESD above a predetermined value, any configuration may be implemented.

Given below is the explanation of operations in the case where the electric rolling stock is applying a regenerative brake, that is, where the inverter unit 30 is performing regenerative operation of the electric motor 40. At that time, the regenerative electric power from the electric motor 40 is inputted to the converter unit 10 via the inverter unit 30. The converter unit 10 maintains the output voltage BES at a constant, predetermined value, while at the same time, it passes the electric power from the output side thereof to the input side thereof and regenerates the regenerative electric power to the catenary 1.

At that time, for example, if a situation occurs when another vehicle that has been accelerating on the catenary 1 stops the acceleration thereby leading to decrease in the consumed regenerative electric power (hereinafter, referred to as regenerative load) to such an extent that the regenerative load drops below the regenerative electric power of the electric motor 40, then the input voltage ESD or capacitor voltage EFCD of the converter unit 10 increases. If that condition is left as it is, then the input voltage ESD or the capacitor voltage EFCD further increases, so that the converter unit 10 detects an overvoltage and trips, by which the devices connected to the catenary 1 are damaged.

In the configuration according to the second embodiment, the input voltage ESD or capacitor voltage EFCD of the converter unit 10 is inputted to the inverter control unit 34b, and, based on the increase in the capacitor voltage EFCD or the input voltage ESD, the regenerative torque decreasing amount calculating unit 35b generates the torque decreasing amount VDT and narrows the torque command PTR down (regenerative torque decreasing control).

In the regenerative torque decreasing amount calculating unit 35b, at the point of time when the capacitor voltage EFCD or the input voltage ESD becomes 1800 V, the torque decreasing amount VDT is set to be equal to the requested torque PTRS. Consequently, the torque command PTR becomes zero and the regenerative torque of the electric motor 40 is controlled to be zero. As a result, the regenerative electric power from the electric motor 40 becomes zero, and the input voltage of the converter unit 10 is restrained from increasing. Herein, the input voltage of the converter unit 10 does not become equal to or greater than 1800 V.

As described above, when the regenerative load is insufficient thereby leading to increase in the catenary voltage, the electric power converter of the electric rolling stock according to the present embodiment ensures that the inverter control unit 34b performs torque decreasing of the regenerative torque. Hence, it becomes possible to avoid a situation in which the input voltage of the converter unit 10 increases due to surplus regenerative electric power, which leads to an overvoltage of the converter unit 10 and tripping of the apparatus or causing the apparatus to be damaged.

Meanwhile, in the configuration according to the second embodiment, on the one hand, it becomes necessary to lay wiring for the control between the converter unit 10 and the inverter unit 30. However, on the other hand, a configuration to increase the output voltage BES of the converter unit 10, that is required for the configuration in the first embodiment, is not necessary. That makes it possible to simplify the configuration of the converter control unit 14.

Meanwhile, only when a direction of the electric power passing through the inverter unit 30 is the direction from the output side toward the input side of the inverter unit 30 (only when the electric motor 40 is performing regenerative operation), the inverter control unit 34a can be configured to narrow the torque command PTR down in response to increase in the input voltage of the converter unit 10.

With such a configuration, for example, even if the voltage of the catenary 1 increases while the electric motor 40 is power-running, it becomes possible to prevent increase in the circuit loss of the inverter unit 30 (the switching loss in the inverter circuit 33).

Third Embodiment

In the first and second embodiments, the explanation is given for the case in which, when the regenerative load of the catenary 1 decreases while the electric motor 40 is on regenerative operation, the input voltage of the converter unit 10 is restrained from increasing. However, following issues arise while the electric motor 40 is on power-running operation.

There are the case where the transformer substation (not illustrated) that supplies electric power to the catenary 1 is small in capacity, the case where the distance from the transformer substation to the electric rolling stock is long and thereby voltage drop of the catenary 1 is large, and the case where the voltage of the catenary 1 is reduced while the electric motor 40 is on power-running operation. In such cases, if a power-running power of the electric motor 40 is kept as it is and/or more electric power further consumed for the acceleration, then the voltage of the catenary 1 may decrease too much thereby causing the operations of the converter unit 10 to be stopped due to the too-low voltage and/or the other vehicles receiving electricity from the catenary 1 become unable to run due to the low voltage. Hence, once the voltage of the catenary 1 becomes equal to or smaller than a predetermined value, it becomes necessary to lower the power-running torque and to reduce the power-running electric power.

Generally, in an electric railroad for which the catenary 1 has a nominal voltage of 1500 volts DC, it is necessary to ensure that the voltage of the catenary 1 does not fall below 1100 V. However, the converter unit 10 is performing constant voltage control to maintain the output voltage BES thereof at a predetermined voltage. Hence, even if the input voltage ESD or the capacitor voltage EFCD decreases, the converter unit 10 attempts to control the output voltage BES to a constant value irrespective of the input voltage. For that reason, the inverter unit 30 can not figure out decrease in the voltage of the catenary 1 and hence cannot perform control, for example to reduce the power-running torque of the electric motor 40. In turn, the drop in voltage of the catenary 1 can not be controlled.

To this end, when the capacitor voltage EFCD or the input voltage ESD is equal to or greater than a predetermined value (for example, 1100 V), the converter control unit 14 sets the output voltage command VREF to a normal value (for example, 600 V) that is a third setting value, and when the capacitor voltage EFCD or the input voltage ESD drops below a predetermined value (for example, 1100 V), the converter control unit 14, based on the amount of decrease thereof, reduces the output voltage command VREF to a fourth setting value (for example, 500 V) that is smaller than the third setting value.

Moreover, when the input voltage ES or capacitor voltage EFC of the inverter unit 30 drops below a predetermined value (for example, 550V), the inverter control unit 34a refers to the amount of decrease thereof and accordingly lowers a power-running torque command of the electric motor 40, so as to make control to reduce the power-running electric power.

As described above, at the time of decrease in voltage of the catenary 1, the electric power converter of the electric rolling stock according to the present embodiment decreases the output voltage BES of the converter unit 10, and operates to ensure that the inverter unit 30 curbs the power-running torque of the electric motor 40. Hence, the power-running electric power of the electric motor 40 can be reduced and the drop in voltage of the catenary 1 can be curbed. As a result, it becomes possible to avoid a situation in which the operations of the converter unit 10 is stopped due to the low voltage or the other vehicles receiving electricity from the catenary 1 become unable to run due to the low voltage.

Moreover, in the configuration according to the third embodiment, since there is no communication of control signals between the converter unit 10 and the inverter unit 30, it becomes possible to reduce hard-wiring therefor.

Meanwhile, only when a direction of the electric power passing through the converter unit 10 is the direction from the input side toward the output side of the converter unit 10 (only when the electric motor 40 is performing power-running operation), the converter control unit 14 may be configured to reduce the output voltage command VREF in response to decrease in the input voltage of the converter unit 10.

With such a configuration, for example, if the voltage of the catenary 1 decreases while the electric motor 40 is on regenerative operation, the need for decreasing the output voltage BES of the converter unit 10 is eliminated. Hence, it becomes possible to avoid a situation in which the applied voltage to the electric motor 40 is insufficient due to decrease in the voltage thereby resulting in decrease in the regenerative torque.

In addition, in the description given above, the case of controlling the output voltage command VREF as a control command is explained, but other commands may be used. For example, although not illustrated in the drawings, an output current command that is a command for the output current of the converter circuit 13 may also be controlled. That is because, even by controlling the output current, the output voltage BES can be controlled indirectly.

Fourth Embodiment

A fourth embodiment, in an identical manner to the second embodiment, has such a construction that the input voltage ESD and capacitor voltage EFCD of the converter unit 10 are inputted to the inverter control unit 34b of the inverter unit 30.

When the capacitor voltage EFCD or input voltage ESD of the converter unit 10 drops below a predetermined value (for example, 1100 V), the inverter control unit 34b refers to the amount of decrease thereof and accordingly reduces the power-running torque of the electric motor 40 (power-running torque reduction control) and operates to curb the power-running electric power. Herein, all values are exemplary and are not to be considered as restrictive. Rather, as long as the power-running torque of the electric motor 40 is curbed in response to decrease in the capacitor voltage EFCD or the input voltage ESD below a predetermined value, any configuration can be implemented.

As described above, at the time when the voltage of the catenary 1 is dropped, the electric power converter of the electric rolling stock according to the present embodiment ensures that the inverter control unit 34b of the inverter unit 30 curbs the power-running torque of the electric motor 40. Hence, the power-running electric power of the electric motor 40 can be reduced and the decrease in voltage of the catenary 1 can be curbed. As a result, it becomes possible to avoid a situation in which the operations of the converter unit 10 are stopped due to the low voltage or the other vehicles receiving electricity from the catenary 1 become unable to run due to the low voltage.

It is noted that only when a direction of the electric power is the converter unit 10 passes in the direction from the input side toward the output side of the converter unit 10 (only when the electric motor 40 is performing power-running operation), the inverter control unit 34b may be configured to reduce the power-running torque of the electric motor 40 in response to decrease in the input voltage of the converter unit 10.

With such a configuration, for example, if the voltage of the catenary 1 decreases while the electric motor 40 on regenerative operation, then it becomes possible to prevent unnecessary reduction in the regenerative torque of the electric motor 40.

Besides, in the configuration according to the fourth embodiment, on the one hand, it becomes necessary to lay wiring for the control between the converter unit 10 and the inverter unit 30. However, on the other hand, a configuration to reduce the output voltage BES of the converter unit 10, required in the third embodiment is not required. That makes it possible to simplify the configuration of the converter control unit 14.

The configurations described in the above embodiments are intended to show illustrative examples of the contents of the present invention, and needless to say, they can be combined with the other publicly-known techniques and can be made modified and/or partially subjected to omission, without departing from the scope of the invention.

Industrial Applicability

In this way, the present invention is applicable to an electric power converter installed to perform propulsion control of an electric rolling stock, and is particularly useful as an invention that enables favorable regenerative torque decreasing control.

REFERENCE SIGNS LIST

1 CATENARY
2 POWER COLLECTOR
3 WHEEL
4 RAIL
10 CONVERTER UNIT (FIRST ELECTRIC-POWER CONVERTING UNIT)
11, 31 REACTOR
12, 32 CAPACITOR
13 CONVERTER CIRCUIT
14 CONVERTER CONTROL UNIT (FIRST CONTROL UNIT)
15 VOLTAGE COMMAND PROCESSING UNIT
16 VOLTAGE CONTROL UNIT
30 INVERTER UNIT (SECOND ELECTRIC-POWER CONVERTING UNIT)
33 INVERTER CIRCUIT 34a, 34b INVERTER CONTROL UNIT (SECOND CONTROL UNIT)
35a, 35b REGENERATIVE TORQUE DECREASING AMOUNT CALCULATING UNIT
36 SUBTRACTOR
37 TORQUE CALCULATING UNIT
40 ELECTRIC MOTOR
BES OUTPUT VOLTAGE
EFC, EFCD CAPACITOR VOLTAGE
ES, ESD INPUT VOLTAGE
GD, GI CONTROL SIGNAL
IM OUTPUT CURRENT
PTR TORQUE COMMAND
PTRS REQUESTED TORQUE
VDT TORQUE DECREASING AMOUNT
VREF OUTPUT VOLTAGE COMMAND

The invention claimed is:

1. An electric power converter of an electric rolling stock comprising:
a first electric-power converting unit that receives a direct-current voltage and outputs a direct-current voltage controlled to a predetermined value; and
a second electric-power converting unit that is connected to an output side of the first electric-power converting unit, and converts a direct-current power from the first electric-power converting unit into an alternating-current power and drives an electric motor,
wherein the first electric-power converting unit includes a first control unit that, based on a voltage detected on an input side of the first electric-power converting unit, generates a control command that is a command for an output voltage of the first electric-power converting unit,
the first control unit is configured to control the control command so as to increase an output voltage of the first electric-power converting unit in response to an increase of the voltage detected on the input side of the first electric-power converting unit, and
the second electric-power converting unit includes a second control unit that performs regenerative torque decreasing control for decreasing a torque of the electric motor in response to a voltage detected on the output side of the first electric-power converting unit increasing above a predetermined value.

2. The electric power converter of the electric rolling stock according to claim 1, wherein, when the voltage detected on the input side of the first electric-power converting unit is equal to or smaller than a predetermined value, the first control unit sets the control command to a first setting value, and, when the voltage detected on the input side of the first electric-power converting unit exceeds the predetermined value, the first control unit sets the control command to a second setting value that is greater than the first setting value based on an excess amount thereof.

3. The electric power converter of the electric rolling stock according to claim 1, wherein, only when a direction of the electric power passing through the first electric-power converting unit is the direction from the output side toward the input side of the first electric-power converting unit, the first control unit controls the control command in response to increase in the voltage detected on the input side of the first electric-power converting unit.

4. An electric power converter of an electric rolling stock comprising:
a first electric-power converting unit that receives a direct-current voltage and outputs a direct-current voltage controlled to a predetermined value; and
a second electric-power converting unit that is connected to an output side of the first electric-power converting unit, converts a direct-current power from the first electric-power converting unit into an alternating-current power and drives an electric motor,
wherein the second electric-power converting unit includes a second control unit that, in response to a voltage detected on an input side of the first electric-power converting unit increasing above a predetermined value, performs regenerative torque decreasing control so as to reduce the torque of the electric motor.

5. The electric power converter of the electric rolling stock according to claim 4, wherein, only when a direction of the electric power passing through the second electric-power converting unit is the direction from the output side toward the input side of the second electric-power converting unit, the second control unit performs the regenerative torque decreasing control in response to increase in the voltage detected on an input side of the first electric-power converting unit.

6. An electric power converter of an electric rolling stock comprising:
a first electric-power converting unit that receives a direct-current voltage and outputs a direct-current voltage controlled to a predetermined value; and
a second electric-power converting unit that is connected to an output side of the first electric-power converting unit, and converts a direct-current power from the first electric-power converting unit into an alternating-current power and drives an electric motor,
wherein the first electric-power converting unit includes a first control unit that, based on a voltage detected on an input side of the first electric-power converting unit, generates a control command for controlling a condition of an output voltage of the first electric-power converting unit,
the first control unit generates a control command for adjusting a state of an output voltage of the first electric-power converting unit so as to enable reduction of the power-running torque of the second electric-power converting unit, and
the second electric-power converting unit includes a second control unit that, in response to the voltage detected on an output side of the first electric-power converting unit dropping below a predetermined value, performs control so as to reduce power-running torque of the electric motor.

7. The electric power converter of the electric rolling stock according to claim 6, wherein, in response to the voltage detected on an input side of the first electric-power converting unit dropping below a predetermined value, the first control unit controls the control command.

8. The electric power converter of the electric rolling stock according to claim 6, wherein, in response to the voltage detected on an input side of the first electric-power converting unit being equal to or greater than a predetermined value, the first control unit sets the control command to a third setting value and, in response to the voltage detected on an input side of the first electric-power converting unit dropping below the predetermined value, the first control unit sets the control command to a fourth setting value that is smaller than the third setting value based on a drop amount thereof.

9. The electric power converter of the electric rolling stock according to claim 6, wherein, only when a direction of the electric power passing through the first electric-power converting unit is the direction from the input side toward the output side of the first electric-power converting unit, the first control unit controls the control command in response to drop in the voltage detected on an input side of the first electric-power converting unit below a predetermined value.

* * * * *